US006082520A

United States Patent [19]

Kleewein et al.

[11] Patent Number: 6,082,520

[45] Date of Patent: Jul. 4, 2000

[54] ESCALATOR OR MOVING WALKWAY WITH INCLINED BALUSTRADE

[75] Inventors: Gerhard Kleewein, Pressbaum; Walter Thierer, Vienna, both of Austria

[73] Assignee: Inventio AG, Hergisil, Switzerland

[21] Appl. No.: 09/175,826

[22] Filed: Oct. 20, 1998

[30] Foreign Application Priority Data

Nov. 3, 1997 [EP] European Pat. Off. ............ 978108222

[51] Int. Cl.[7] ............ B65G 15/00

[52] U.S. Cl. ............ 198/335; 198/324

[58] Field of Search ............ 198/324, 326, 198/335, 337

[56] References Cited

U.S. PATENT DOCUMENTS

| | | | |
|---|---|---|---|
| 2,785,286 | 3/1957 | Lichtgarn . | |
| 5,040,659 | 8/1991 | Saito et al. ............ | 198/335 X |

FOREIGN PATENT DOCUMENTS

| | | | |
|---|---|---|---|
| 13279 | 2/1977 | Japan ............ | 198/324 |
| 61086 | 5/1977 | Japan ............ | 198/324 |
| 40998 | 4/1978 | Japan ............ | 198/335 |
| 147697 | 6/1991 | Japan ............ | 198/337 |

*Primary Examiner*—James R. Bidwell
*Attorney, Agent, or Firm*—Schweitzer Cornman Gross & Bondell LLP

[57] ABSTRACT

An escalator or moving walkway has an inclined balustrade superstructure extending along the sides of a step or pallet belt between a first story and a second story. The upper edge of the balustrade has a handrail, which is fastened to a balustrade profile member, which is supported by a balustrade support. The balustrade profile member is connected to a base by means of an oblique extending inner facing. Illuminating equipment for illumination of the belt is arranged at the base, and supports portions of at least one of the balustrade base and superstructure. The illumination equipment is flush with the base to provide a continuous facing surface.

4 Claims, 4 Drawing Sheets

ESCALATOR OR MOVING WALKWAY WITH INCLINED BALUSTRADE

The present invention relates to an escalator or a moving walkway consisting of a step belt or pallet belt for the transport of persons and/or objects, a balustrade with an inclined balustrade superstructure and handrail, and illuminating equipment, which is arranged in a balustrade base, for illumination of the step belt or pallet belt.

BACKGROUND OF THE INVENTION

An escalator with a base support, at which a base facing is arranged, has become known from U.S. Pat. No. 2,785, 286. The base facing is made fast at one end to a bracket of the base support and is held at the other end by a clamping strip, to which an obliquely arranged balustrade panel is also fixed. Illuminating equipment arranged rearwardly in the base and supplied by the support structure of the escalator provides illumination of the step region. A reflector conducts the light of a tubular light source through a transparent base facing into the walk region of the step belt.

A disadvantage of the known equipment lies in that due to the support construction for the base facing and for the obliquely arranged balustrade panel no space for the illuminating equipment is present in the base facing region. The light from the light source must be conducted forwardly into the walk region by means of an expensive reflector. Moreover, the illuminating equipment is poorly accessible for maintenance operations.

It is accordingly the purpose of the present invention to provide a balustrade structure having illumination equipment which avoids the disadvantages of known equipment and locates the illuminating equipment as close as possible to the step belt or to the pallet belt.

BRIEF DESCRIPTION OF THE INVENTION

In accordance with the foregoing and other purposes and objects an escalator or moving walkway of the present invention comprises a belt for the transport of persons and/or objects, a balustrade along a side of the belt having components forming a balustrade base, a balustrade superstructure and a handrail. Illumination equipment for illuminating the belt is located at the balustrade base, and includes means for supporting components of at least one of the balustrade base and balustrade superstructure.

The invention provides optimal illumination of the step belt or pallet belt; a compact construction of the entire base is also achieved. Moreover, because of the positioning of the illumination equipment only a relatively small light exit surface is necessary in the base facing for optimal illumination. Damage due to vandalism or inattention of the user is thereby largely avoided. Moreover, the illuminating equipment is readily accessible for maintenance operations.

BRIEF DESCRIPTION OF THE DRAWINGS

The invention is more fully explained in the following by reference to drawings illustrating preferred, but nonetheless illustrative embodiments, wherein.

DETAILED DESCRIPTION OF THE INVENTION

Figure 1:
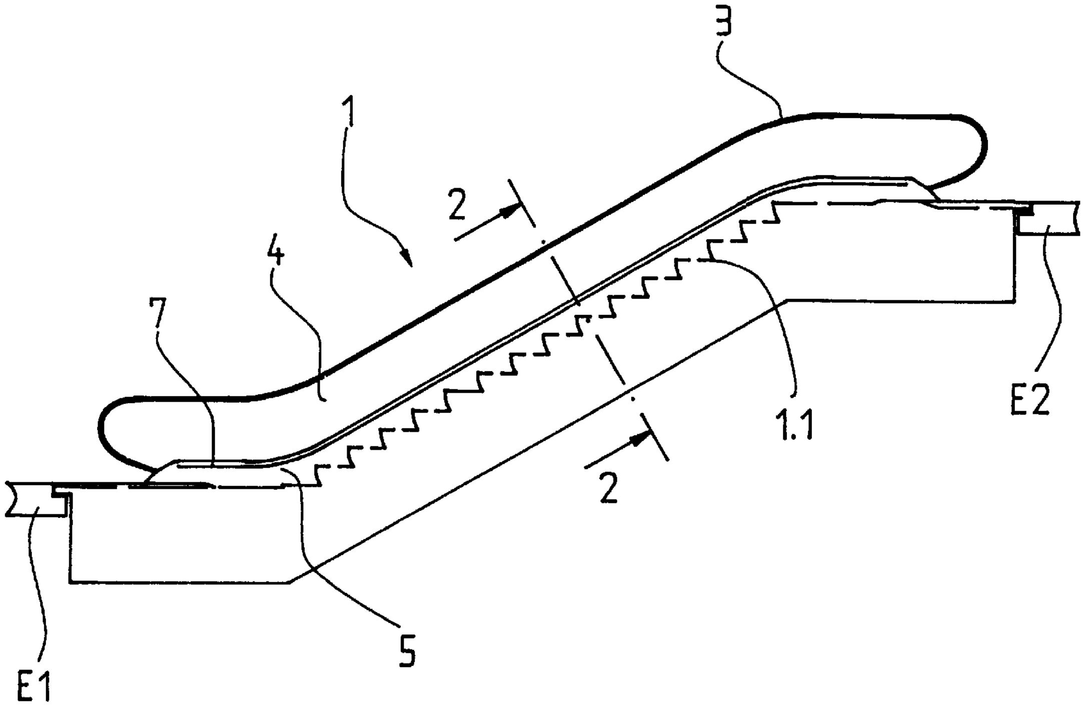
FIG. 1 shows an escalator with an inclined balustrade and base illumination in accordance with the present invention.
Figure 2:
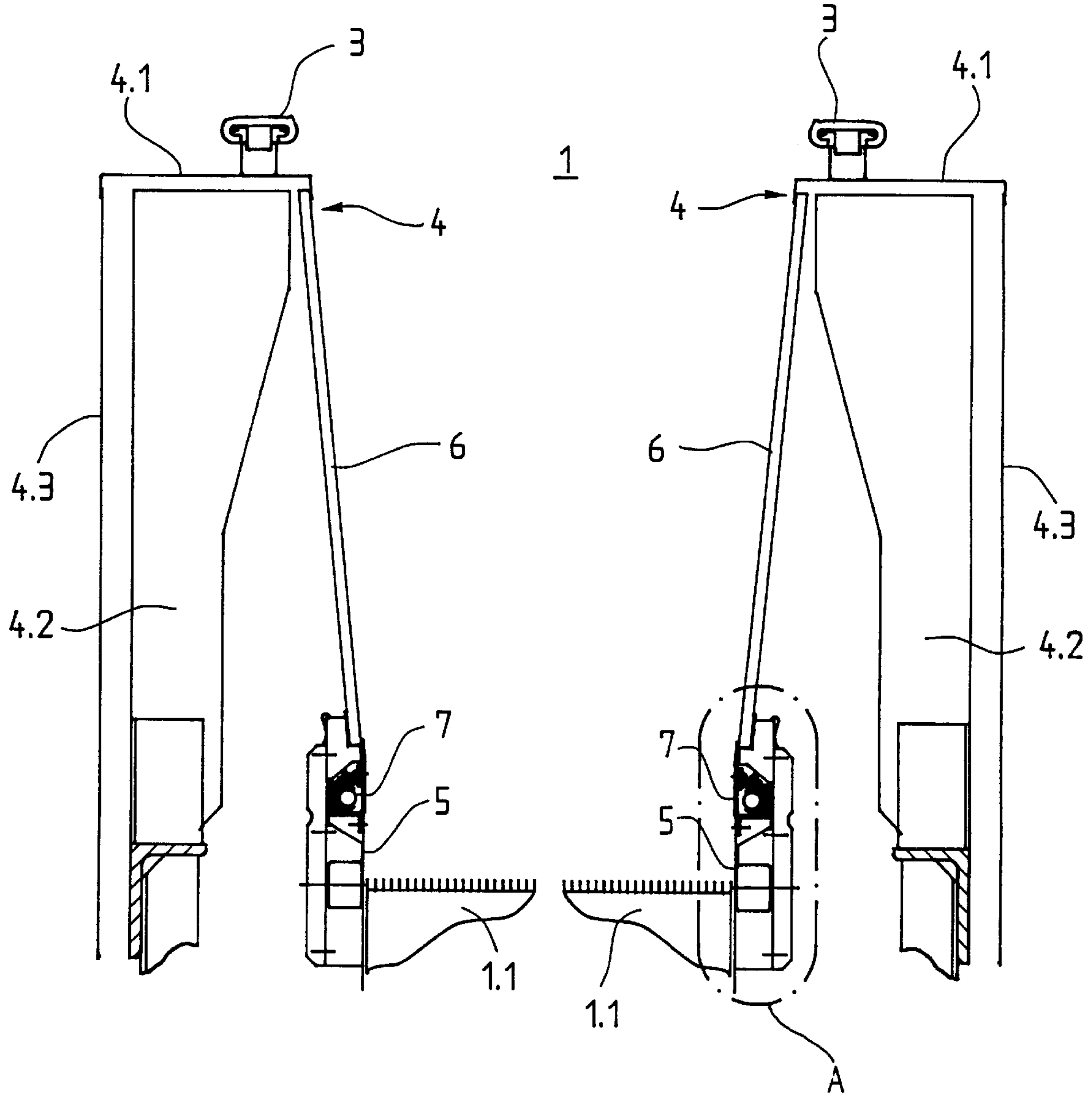
FIG. 2 shows a section view taken along line 2—2 of FIG. 1.

In FIGS. 1 to 4, an escalator or a moving walkway 1 connecting a first storey E1 to a second story E2 has an inclined balustrade superstructure and a step belt 1.1 in the form of steps or a pallet belt consisting of pallets is designated by 1.1. Such escalators or moving walkways with inclined balustrade superstructures are provided for locations with rough environmental conditions, such as for example underground railways, and are largely vandal-proof. The upper boundary or edge of the balustrade 4 supports a handrail 3, which is fastened to a balustrade profile member 4.1, which is in turn supported by a balustrade support 4.2. At the sides of the step belt, the balustrade profile members 4.1 are connected by means of an obliquely extending inner facing 6 coupled to balustrade base 5. The inner facing 6 can be built up from sheet metal parts or as a sandwich construction. An outer facing 4.3 covers the balustrade support 4.2. Illuminating equipment 7 is arranged at the base 5.

Figure 3:
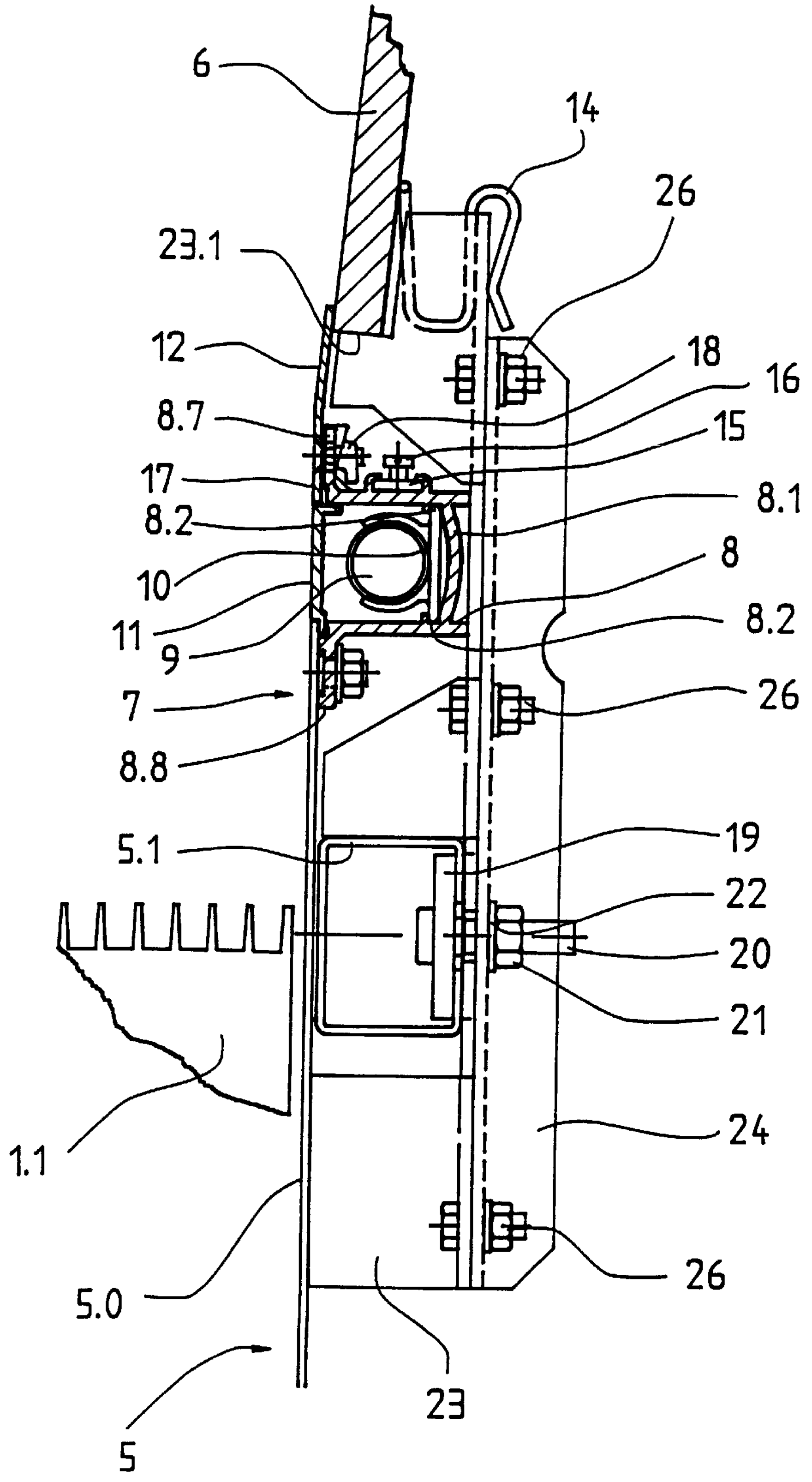
FIG. 3 details section A of FIG. 2, showing the base with the illuminating equipment.

As detailed in FIG. 3, the illuminating equipment 7 comprises an illuminating profile member 8, which may be formed as an extrusion of a suitable synthetic material and which is connected at a fifth lug 8.8 to a base plate 5.0. The rearward part of the illuminating profile member 8 is formed as a reflector 8.1. Disposed in front of the reflector 8.1 as part of the profile member are two dogs 8.2, by which a light source mount 10 for a light source 9 is retained. The light source can comprise, for example, cold cathode tubes, optical conductors with lateral light exits or rows of light-emitting diodes. A transparent first cover 11 is provided as a closure, flush with the base plate 5.0. The illuminating profile member 8 extending along the step or pallet belt 1.1. may consist of several sections which, at their joint locations, have joining straps 15 by which the sections are connected together by means of screws 16.

Arranged above the illuminating equipment 7 is a second cover 12, which forms a transition element between the transparent first cover 11 and the inner facing 6, and which is fastened to the illuminating profile member 8 by means of countersunk screws 17, wherein cage nuts 18, fastened to a fourth lug 8.7 of the illuminating profile member 8, provide mating threads. U-shaped first and second sheet metal parts 23, 24 joined into a unit by screw connections 26 are fastened to a C-shaped profile member 5.1 of the base plate 5.0 of the base 5 by means of a second strap 19, screw 20, nut 21 and lock washer 22. The first sheet metal part 23 has a punched-out portion 23.1 at its upper end which serves as a rest for the inner facing 6. A spring element 14 presses the inner facing 6 flushly against the second cover 12. A resilient synthetic material part can be used instead of the spring element 14.

Figure 4:
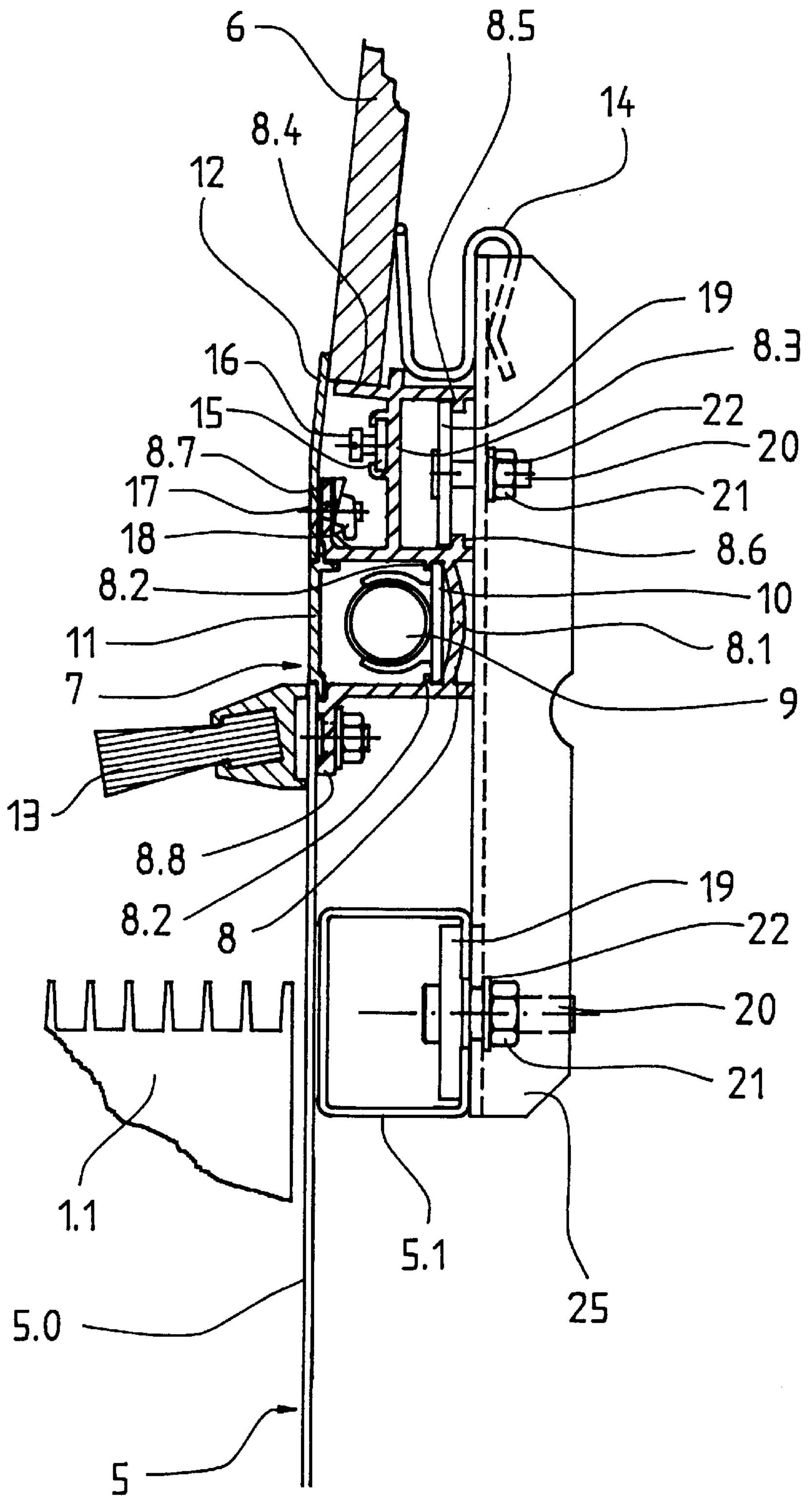
FIG. 4 presents an alternative embodiment of the base and the illuminating equipment.

An alternative embodiment of the base with the illuminating equipment 7 is shown in FIG. 4. As shown therein, the joint straps 15 connecting the illuminating profile members 8 are arranged upon an additional vertical web 8.3 formed as part of the illuminating profile 8. A first lug 8.4 of the web 8.3 serves as a rest for the inner facing 6. A second lug 8.5, together with a third lug 8.6, fix a strap 19, which is screw-connected to a U-shaped bent sheet metal part 25 of the base 5 by means of the fastening elements 20, 21, 22 and thus serves to join the metal part 25 to the illuminating profile member 8. A deflector brush 13 can be selectably fastened to a fifth lug 8.8 of the illuminating profile member 8.

We claim:

1. An escalator or moving walkway consisting of a step belt or pallet belt for the transport of persons and objects, a balustrade arranged along a side of the step or pallet belt having components forming a balustrade base, an inclined balustrade superstructure and a handrail, and illuminating equipment located at the balustrade base for illumination of the step belt or pallet belt, characterized in that the illuminating equipment comprises an illuminating profile member extending along the step belt or pallet belt having a front surface flush with the balustrade base and includes means for the support of at least one of the components of at least one of the balustrade base and the balustrade superstructure.

2. The escalator or moving walkway according to claim 1, wherein the means for the support of the components comprise lugs for fastening of the components to the illuminating profile member.

3. The escalator or travelling walkway according to claim 2, wherein the illuminating profile member includes a rearward part constructed as a reflector and dogs located forwardly of said reflector, to which a light source mount for a light source is fixed.

4. The escalator or moving walkway according to claim 3, wherein the light source is chosen from the group consisting of cold cathode tubes, optical conductors with lateral light exits and rows of light-emitting diodes.

* * * * *